(12) United States Patent
Williams et al.

(10) Patent No.: US 11,074,301 B2
(45) Date of Patent: Jul. 27, 2021

(54) SYSTEMS AND METHODS FOR AUTOMATED DATA VISUALIZATION RECOMMENDATIONS

(71) Applicant: Facebook, Inc., Menlo Park, CA (US)

(72) Inventors: Vivin Antony Williams, Campbell, CA (US); Ryan David Robitaille, San Anselmo, CA (US)

(73) Assignee: Facebook, Inc., Menlo Park, CA (US)

( * ) Notice: Subject to any disclaimer, the term of this patent is extended or adjusted under 35 U.S.C. 154(b) by 277 days.

(21) Appl. No.: 15/842,272

(22) Filed: Dec. 14, 2017

(65) Prior Publication Data

US 2019/0188333 A1 Jun. 20, 2019

(51) Int. Cl.
*G06F 16/00* (2019.01)
*G06F 16/904* (2019.01)
*G06N 20/00* (2019.01)
*G06F 16/9038* (2019.01)
*G06F 16/2457* (2019.01)
*G06F 16/9032* (2019.01)

(52) U.S. Cl.
CPC ...... *G06F 16/904* (2019.01); *G06F 16/24578* (2019.01); *G06F 16/9038* (2019.01); *G06F 16/90328* (2019.01); *G06N 20/00* (2019.01)

(58) Field of Classification Search
CPC .. G06F 16/9535; G06F 16/22; G06F 16/2228; G06F 16/2255; G06F 16/2425; G06F 16/2455; G06F 16/24568; G06F 16/2462; G06F 16/2477; G06F 16/248; G06F 16/25; G06F 16/285; G06F 16/8373; G06F 16/901; G06F 16/90335; G06F 16/9038; G06F 16/951; G06F 3/0481; G06F 17/16; G06F 17/18; G06F 3/04883; G06F 17/218; G06F 17/2211; G06F 17/2247; G06F 17/243; G06F 17/248; G06F 8/10; G06F 8/36; G06F 40/14; G06F 40/186; G06F 40/106; G06F 16/2465; G06F 16/27; G06F 19/3418; G06F 40/117; G06F 40/174; G06F 40/194; G06F 9/4488; G06F 16/243; G06F 16/3322; G06F 16/3329; G06F 16/3344; G06F 16/338; G06F 16/00; G06F 16/78; G06F 9/451; G06F 16/24578; G06F 16/90328; G06F 16/904
See application file for complete search history.

(56) References Cited

U.S. PATENT DOCUMENTS

| | | | |
|---|---|---|---|
| 2011/0087675 A1* | 4/2011 | Colombino | G06Q 10/10 707/749 |
| 2013/0024757 A1* | 1/2013 | Doll | G06F 40/106 715/204 |
| 2014/0247268 A1* | 9/2014 | Drucker | G06T 11/206 345/440.2 |
| 2017/0220633 A1* | 8/2017 | Porath | G06F 9/542 |

* cited by examiner

*Primary Examiner* — Shyue Jiunn Hwa
(74) *Attorney, Agent, or Firm* — Sheppard Mullin Richter & Hampton LLP

(57) ABSTRACT

Systems, methods, and non-transitory computer-readable media can determine a set of potential visualizations for a data set based on a set of visualization templates. The set of potential visualizations is ranked based on ranking criteria. A set of visualization recommendations for the data set is determined based on the ranking.

19 Claims, 7 Drawing Sheets

SYSTEMS AND METHODS FOR AUTOMATED DATA VISUALIZATION RECOMMENDATIONS

FIELD OF THE INVENTION

The present technology relates to the field of digital data visualizations. More particularly, the present technology relates to systems and methods for automated data visualization recommendations.

BACKGROUND

Today, people often utilize computing devices (or systems) for a wide variety of purposes. Users can use their computing devices, for example, to interact with one another, create content, share content, and view content. As users create content and interact with one another on their computing devices, they generate and share data. Advances in computing technology have resulted in decreasing costs for data storage. Improved computing technology and decreasing data storage costs have allowed for the collection and storage of more data than previously possible.

SUMMARY

Various embodiments of the present disclosure can include systems, methods, and non-transitory computer readable media configured to determine a set of potential visualizations for a data set based on a set of visualization templates. The set of potential visualizations is ranked based on ranking criteria. A set of visualization recommendations for the data set is determined based on the ranking.

In an embodiment, each visualization template of the set of visualization templates is associated with one or more rules.

In an embodiment, for a first visualization template of the set of visualization templates, at least one rule of the one or more rules pertains to data cardinality.

In an embodiment, the at least one rule specifies that a first data field must have a cardinality below a threshold.

In an embodiment, the at least one rule specifies that a first data field must have a cardinality above a threshold.

In an embodiment, the ranking criteria comprise past user behavior information.

In an embodiment, the set of potential visualizations are ranked based on a machine learning model.

In an embodiment, a maximum number of visualization recommendations that can be fit on a display of a user computing device is determined.

In an embodiment, the set of visualization recommendations is determined based on the ranking and based on the maximum number of visualization recommendations.

In an embodiment, the data set is received from a user or is a result of a user query.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
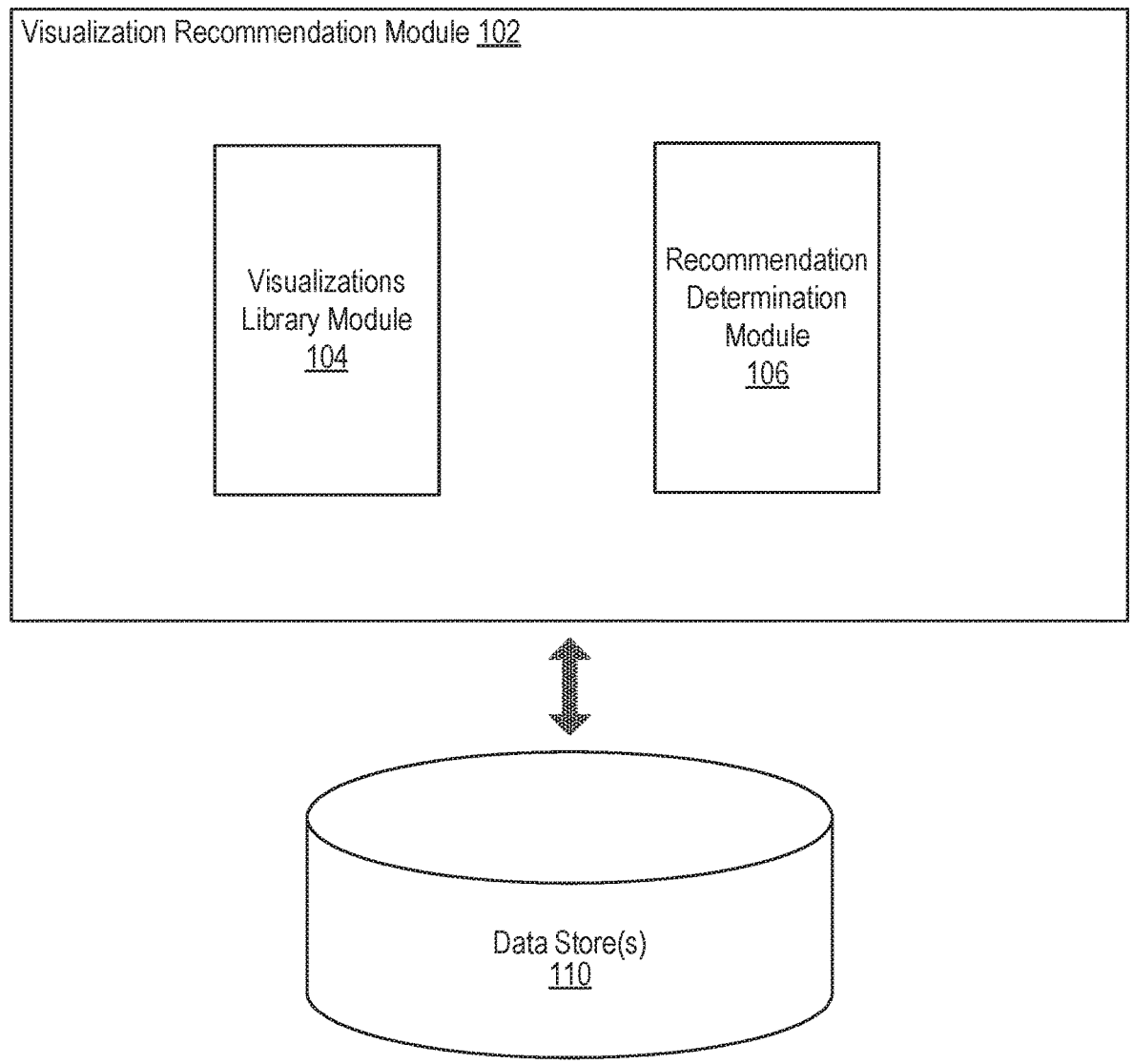
FIG. 1 illustrates an example system including a visualization recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Automated Data Visualization Recommendations

People often utilize computing devices (or systems) for a wide variety of purposes. Users can use their computing devices, for example, to interact with one another, create content, share content, and view content. As users create content and interact with one another on their computing devices, they generate and share data. Advances in computing technology have resulted in decreasing costs for data storage. Improved computing technology and decreasing data storage costs have allowed for the collection and storage of more data than previously possible.

The abundance of available data provides greater opportunities for data analysis by organizations which, in turn, provide opportunities to gain insights that may, for example, improve user experience, increase user engagement, improve user efficiency, and the like. Furthermore, visualizations representative of a data set, such as graphs, charts, or other diagrams, can be used to demonstrate trends or other useful information that can be gleaned from data. However, an overabundance of available data can potentially be overwhelming, and can result in an impractical number of possible data combinations. For example, a set of data comprising millions of entries, and thousands of data fields may be exceptionally difficult to analyze. In such scenarios, the abundance of available data can actually act as a hindrance to learning useful information from the data. As such, under conventional approaches, it may be difficult to identify interesting relationships or trends in large data sets due to the overwhelming number of potential relationships and combinations. Furthermore, the large amount of data available in a data set can make it difficult to determine what types of visualizations are most effective for demonstrating and/or detecting relationships or trends in the data.

An improved approach rooted in computer technology overcomes the foregoing and other disadvantages associated with conventional approaches specifically arising in the realm of computer technology. In general, a system can receive a data set for which one or more data visualization recommendations are to be automatically generated. A visualizations library can comprise a plurality of visualization templates. Each visualization template can define a particular type of visualization (e.g., bar chart, pie chart, line graph, map, etc.). Each visualization template can also be associated with a set of rules. Each visualization template's set of rules can define one or more requirements for that visualization template. Certain visualizations may be optimal for certain types of data sets or data combinations, and may not be as useful for other types of data sets or combinations. For example, a pie chart may not be particularly useful for depicting hundreds of data fields, since each slice of the pie chart would be too small to be seen clearly. As such, a visualization template associated with generating a pie chart may be associated with a rule that states that a first dimension of a data set must have a low cardinality, and a second dimension of the data set must be aggregable and/or numerical. In another example, a visualization template for creating a map visualization may be associated with a rule that specifies that at least one dimension of a data set must be associated with geographic regions or locations. Many variations are possible.

The data set can be analyzed against the plurality of visualization templates in the visualizations library, and the associated sets of rules, to identify a set of potential visualizations. Each potential visualization can comprise a visualization template and a subset of the data set that satisfies the set of rules associated with the visualization template. In other words, each potential visualization represents a visualization that could potentially be generated based on the data set and the set of visualization templates. The set of potential visualizations can be ranked based on a set of ranking criteria. A set of visualization recommendations can be selected from the set of potential visualizations based on the ranking. The set of visualization recommendations can be rendered and provided to a user. The user can view the set of visualization recommendations and can select a visualization recommendation that he or she finds to be of interest. The user can then use the selected visualization recommendation and/or modify the selected visualization recommendation based on his or her needs or preferences. The disclosed technology is described in greater detail herein.

FIG. 1 illustrates an example system 100 including an example visualization recommendation module 102, according to an embodiment of the present disclosure. The visualization recommendation module 102 can be configured to automatically generate visualization recommendations for a data set. The visualization recommendation module 102 can receive a data set. The data set may be, for example, a data set provided by a user, or a data set generated as a result of a user query. The data set can, in various embodiments, comprise a plurality of data entries and a plurality of data fields (or categories). The visualization recommendation module 102 can maintain a visualizations library comprising a plurality of visualization templates. The plurality of visualization templates can represent a set of pre-designed visualizations that can be used to generate visualization recommendations for a data set. Each visualization template can be configured to generate a particular type of visualization. Each visualization template can also be associated with a set of rules that specify one or more data characteristics that are required for the visualization template. For example, a visualization template for creating a bar graph may require at least one numerical dimension, and one dimension having a low cardinality (e.g., below a threshold cardinality). In another example, a visualization template for creating a line chart may require at least one numerical dimension and one dimension having a high cardinality (e.g., above a threshold cardinality). A visualization template for creating a time-based line chart may require at least one dimension that is time-based (e.g., times or dates). Many variations are possible.

The visualization recommendation module 102 can analyze the data set and compare it to the sets of rules for the visualization templates in the visualizations library. The visualization recommendation module 102 can identify any combinations of data in the data set that satisfy the rules for any visualization template in the visualizations library. The visualization recommendation module 102 can aggregate all such data combinations and visualization templates into a set of potential visualizations. Each potential visualization can be associated with a subset of the data set (e.g., one or more data fields or categories from the data set) and a visualization template. The visualization recommendation module 102 can rank the set of potential visualizations based on ranking criteria. The visualization recommendation module 102 can select a set of visualization recommendations from the set of potential visualizations based on the ranking. The visualization recommendation module 102 can provide the set of visualization recommendations to a user. For example, the set of visualization recommendations can be rendered in a user interface on a computing device display for presentation to a user. The user can then select a visualization recommendation to use and, in various embodiments, can modify the visualization recommendation according to his or her preferences.

As shown in the example of FIG. 1, the visualization recommendation module 102 can include a visualizations library module 104 and a recommendation determination module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the visualization recommendation module 102 can be implemented in any suitable combinations.

In some embodiments, the visualization recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the visualization recommendation module 102 can be, in part or in whole, implemented as software running on one or more computing devices or systems, such as on a server system or a client computing device. In some instances, the visualization recommendation module 102 can be, in part or in whole, implemented within or configured to operate in conjunction with or be integrated with a social networking system (or service), such as a social networking system 630 of FIG. 6. Likewise, in some instances, the visualization recommendation module 102 can be, in part or in whole, implemented within or configured to operate in conjunction with or be integrated with a client computing device, such as the user device 610 of FIG. 6. For example, the visualization recommendation module 102 can be implemented as or within a dedicated application (e.g., app), a program, or an applet running on a user computing device or client computing system. The application incorporating or implementing instructions for performing functionality of the visualization recommendation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The visualization recommendation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social engagements, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the visualization recommendation module 102. For example, the data store 110 can store a visualizations library, sets of rules for a plurality of visualization templates, one or more data sets, one or more stored visualizations, user behavior information, user preference information, one or more machine learning models for ranking visualizations, and the like. It is contemplated that there can be many variations or other possibilities.

The visualizations library module 104 can be configured to maintain a visualizations library comprising a plurality of visualizations templates. Each visualization template may be associated with generating a particular visualization. In certain embodiments, each visualization template can comprise a code template comprising code to draw a particular type of visualization (e.g., in Javascript). For example, a first visualization template may be configured to generate a bar graph, a second visualization template may be configured to generate a line chart, a third visualization template may be configured to generate a pie chart, a fourth visualization template may be configured to generate a line chart with one or more lines, a fifth visualization template may be configured to generate a map, a sixth visualization template may be configured to generate a bubble chart, a seventh visualization template may be configured to generate a scatter plot, and so forth. In certain embodiments, there may be multiple visualization templates for drawing the same type of visualization with other modifications. For example, a first visualization template may be configured to generate a region-based bar graph and a second visualization template may be configured to generate a financial bar graph. Each visualization template can be associated with a set of rules (i.e., one or more rules). The set of rules for a visualization template may specify various data characteristics that are required for the visualization template. The following are some examples of possible rules:

a data field having a cardinality above a threshold cardinality
 a data field having a cardinality below a threshold cardinality
 a data field having a cardinality within a range of cardinalities (e.g., above a lower threshold and below an upper threshold);
 a data field that is aggregable and/or numerical
 a data field comprising string-based entries
 a data field associated with time and/or date
 a data field associated with geographic location
 a data field associated with financial values
 a data field associated with user metrics These rules are only examples, and it should be understood that many variations are possible.

Certain visualization templates may be associated with multiple rules. For example, a visualization template for creating a bar chart or a pie chart may require a first data field that has a cardinality below a threshold, and a second data field that is numerical and/or aggregable. In certain embodiments, a particular rule may be a combination of multiple rules/requirements. For example, a visualization template for creating a line chart that plots a metric over time may require sufficient data entries with varying timestamps. As such, the visualization template may include a rule that requires a first data set that is both associated with time and/or date and having a high cardinality (e.g., above a threshold cardinality).

While many of the examples discussed herein generally include one or two rules for a visualization template, it should be understood that a visualization template may be associated with any number of rules. For example, a visualization template for creating a line chart with multiple lines may have at least three rules, e.g., a first rule that requires a first data set that is high cardinality (e.g., above a first cardinality threshold) (for the x-axis), a second rule that requires a second data set that is numerical and/or aggregable (for the y-axis), and a third rule that requires a third data set that is low cardinality (e.g., below a second cardinality threshold) (for the multiple lines). In certain embodiments, the visualizations library may be editable such that users are able to submit new visualization templates, or modify existing visualization templates. Creating a new visualization template may comprise defining one or more rules for a visualization template. Modifying a visualization template may comprise modifying a visual aspect of the visualization template and/or modifying one or more rules associated with the visualization template.

The recommendation determination module 106 can be configured to identify a set of visualization recommendations based on a data set and a set of visualization templates. The recommendation determination module 106 can identify a set of potential visualizations based on the data set and the set of visualization templates. The recommendation determination module 106 can rank the set of potential visualizations based on ranking criteria. The recommendation determination module 106 can select one or more visualization recommendations based on the ranking. The recommendation determination module 106 is described in greater detail herein with reference to FIG. 2.

Figure 2:
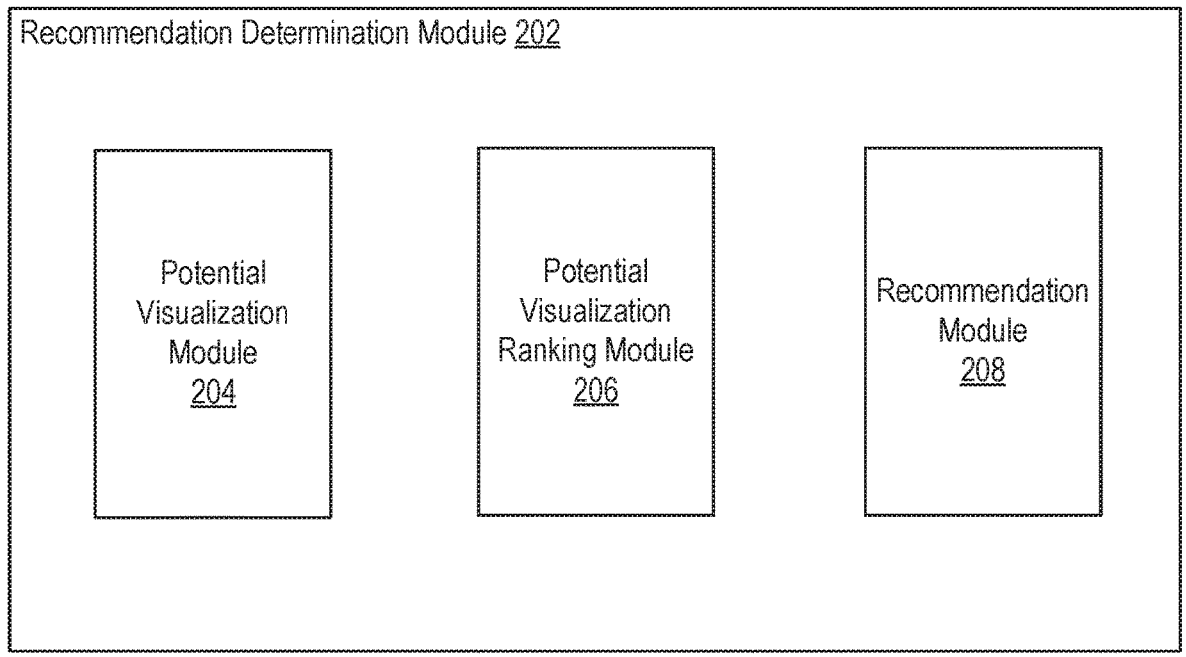
FIG. 2 illustrates an example recommendation determination module, according to various embodiments of the present disclosure.

FIG. 2 illustrates an example recommendation determination module 202 configured to automatically identify a set of visualization recommendations based on a data set and a set of visualization templates, according to an embodiment of the present disclosure. In some embodiments, the recommendation determination module 106 of FIG. 1 can be implemented as the recommendation determination module 202. As shown in the example of FIG. 2, the recommendation determination module 202 can include a potential visualization module 204, a potential visualization ranking module 206, and a recommendation module 208.

The potential visualization module 204 can be configured to identify a set of potential visualizations based on a data set and a set of visualization templates. As described above, each visualization template of the set of visualization templates may be associated with a set of rules defining one or more data characteristics required for that visualization template. Each potential visualization in the set of potential visualizations may comprise a visualization template and a subset of the data set that satisfies the set of rules associated with the visualization template. The set of potential visualizations can comprise all visualizations that could be generated using the data set and the set of visualization templates. A simple example may assist in illustrating the disclosed technology. Consider the following example data set:

| Date | Time | Region | Revenue | # of users |
|---|---|---|---|---|
| Jan. 1, 2017 | 8:00am | Europe | $1,000 | 50 |
| Jan. 1, 2017 | 1:00pm | North America | $ 500 | 25 |
| Jan. 2, 2017 | 9:00am | Asia | $1,500 | 30 |
| Jan. 2, 2017 | 5:00pm | South America | $2,000 | 35 |
| Jan. 3, 2017 | 5:00pm | Africa | $2,500 | 38 |
| Jan. 5, 2017 | 9:00am | Australia | $5,000 | 40 |

Consider also a set of two visualization templates as follows:
- a first visualization template for generating a map having an associated set of rules that require (1) a first data field associated with geographic region; and (2) a second data field that is aggregable and/or numerical; and
- a second visualization template for generating a line graph having an associated set of rules that require (1) a first time-based data field; and (2) a second data field that is aggregable and/or numerical.

Based on this example scenario, the potential visualization module 204 can identify various potential visualizations. For example, the "region" field and the "revenue" field satisfy the first visualization template's set of rules. As such, a first potential visualization can comprise the first visualization template, the "region" field, and the "revenue" field. Similarly, the "region" field and the "# of users" field also satisfy the first visualization template's set of rules. As such, a second potential visualization can comprise the first visualization template, the "region" field, and the "# of users" field. Furthermore, the "date" field in combination with the "revenue" field satisfies the second visualization template's set of rules; the "date" field in combination with the "# of users" field satisfies the second visualization template's set of rules; the "time" field in combination with the "revenue" field satisfies the second visualization template's set of rules; and the "time" field in combination with the "# of users" field satisfies the second visualization template's set of rules. As such, the set of potential visualizations can also include these four additional potential visualizations: (1) the second visualization template+the "date" field+the "revenue" field; (2) the second visualization template+the "date" field+the "# of users" field; (3) the second visualization template+the "time" field+the "revenue" field; and (4) the second visualization template+the "time" field+the "# of users" field. In total, the data set and the set of visualization templates in this example scenario yields a set of six potential visualizations.

The potential visualization ranking module 206 can be configured to rank a set of potential visualizations based on ranking criteria. In various embodiments, ranking criteria can comprise user behavior information. In this regard, potential visualizations reflecting certain chart types or certain data fields that were previously selected by a user can be upranked and potential visualizations that were previously rejected by the user can be downranked. For example, if a particular user and/or a set of users has previously selected visualizations which utilize "revenue" as a field, potential visualizations which utilize a "revenue" data field can be upranked. In another example, if a particular user and/or a set of users have historically demonstrated a preference for line charts while demonstrating a disinterest in bubble charts, potential visualizations for line charts may be upranked and potential visualizations for bubble charts may be downranked.

In various embodiments, ranking criteria can be based on a work group or intended viewership. For example, if visualization recommendations are being prepared for a user in an accounting department, potential visualizations that comprise a monetary field may be upranked. Conversely, if visualization recommendations are being prepared for a user in a people (human resources) analytics department, potential visualizations that comprise a headcount field or other user engagement field may be upranked.

In certain embodiments, a machine learning model can be trained to implement the ranking criteria. For example, the machine learning model can be trained using a set of training data comprising visualization recommendations previously presented to users, and user selections from the visualization recommendations. The machine learning model can utilize the training data to identify various user characteristics and/or visualization characteristics which are most predictive of whether or not a particular user having particular user characteristics will select a particular visualization recommendation having particular visualization characteristics. The trained machine learning model can be configured to rank a set of potential visualizations based on a likelihood that a user will select a potential visualization if presented as a visualization recommendation.

In certain embodiments, the potential visualization ranking module 206 can be configured to uprank certain potential visualizations based on a recommendation diversity consideration. For example, if the top x potential visualizations include only line charts, it may be undesirable to present a user with only line chart visualization recommendations. As such, the potential visualization ranking module 206 can be configured to uprank certain potential visualizations that would increase diversity in a set of visualization recommendations. Accordingly, with respect to the example in which the top x potential visualizations include only line charts, the potential visual ranking module 206 can uprank chart types that are not line charts.

The recommendation module 208 can be configured to identify one or more visualization recommendations, and to provide the one or more visualization recommendations to a user. In various embodiments, the recommendation module 208 can identify one or more visualization recommendations based on a ranked set of potential visualizations. For example, the recommendation module 208 can select a pre-determined number of potential visualizations from the top of the ranked set of potential visualizations to be presented as visualization recommendations.

In various embodiments, the recommendation module 208 can be configured to determine how many visualization recommendations to select based on a maximum number of possible visualization recommendations. Dimension requirements can be imposed on each visualization recommendation. For example, the dimension requirements may specify that each visualization recommendation must be 200 pixels by 200 pixels. The recommendation module 208 can be configured to identify a maximum number of visualization recommendations that can fit on a user's computing device display based on the dimension requirements. For example, a display having a resolution of 1028×1028 can fit a maximum of twenty-five 200×200 visualization recommendations. The recommendation module 208 can select the top twenty-five potential visualizations from the ranked set of potential visualizations to be presented as visualization recommendations.

Figure 3:
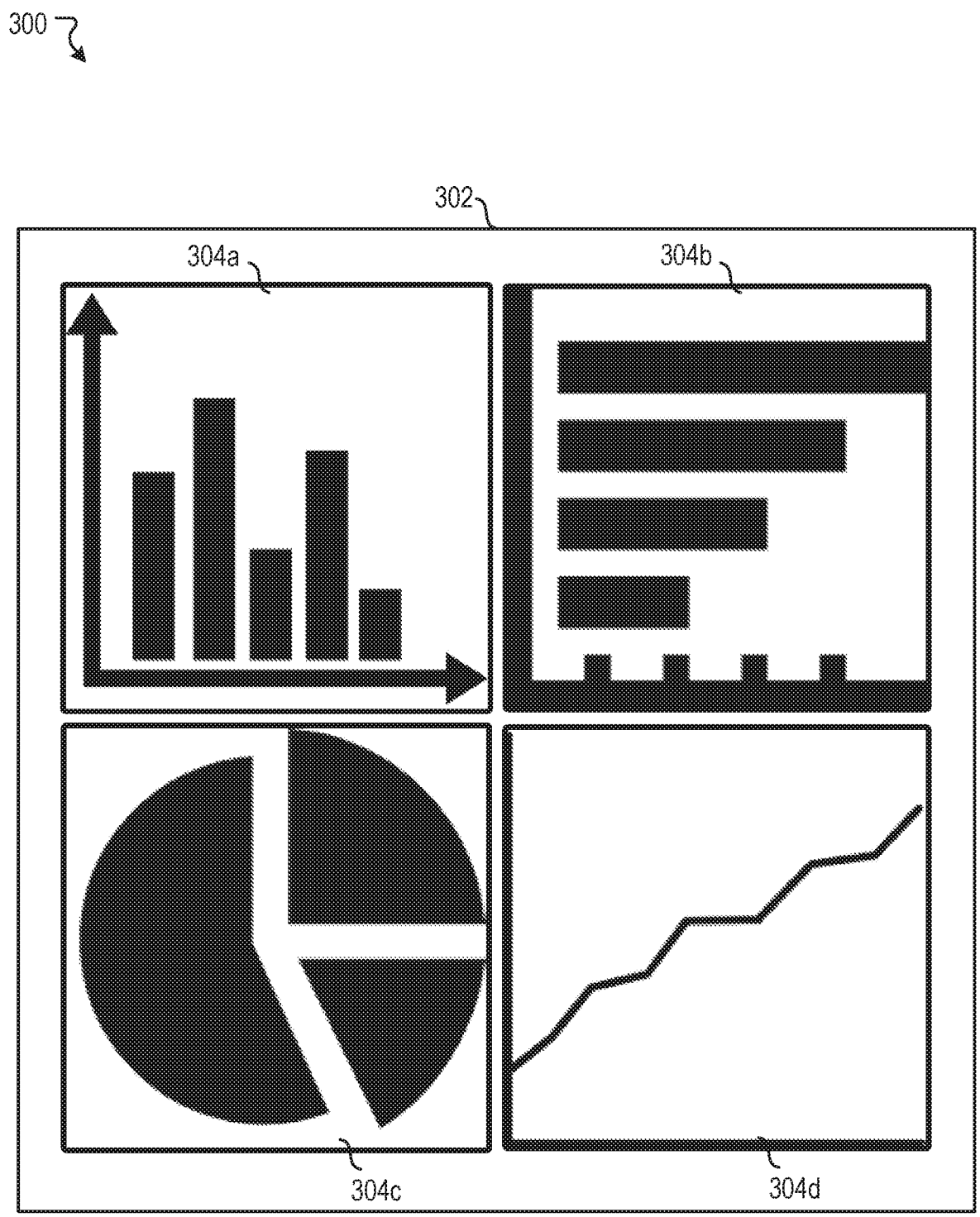
FIG. 3 illustrates an example visualization recommendation interface, according to various embodiments of the present disclosure.

FIG. 3 illustrates an example scenario 300 associated with providing visualization recommendations, according to an embodiment of the present disclosure. The example scenario includes a user interface 302. The user interface 302 presents four visualization recommendations 304a-d. The four visualization recommendations 304a-d may have been selected from a ranked set of potential visualizations. For example, the four visualization recommendations may represent the top four potential visualizations from the ranked set of potential visualizations determined by the visualization recommendation module 102. A user viewing the user interface 302 can use the user interface 302 to select a visualization recommendation. The user can then use the visualization recommendation and/or modify the visualization recommendation according to his or her preferences.

Figure 4:
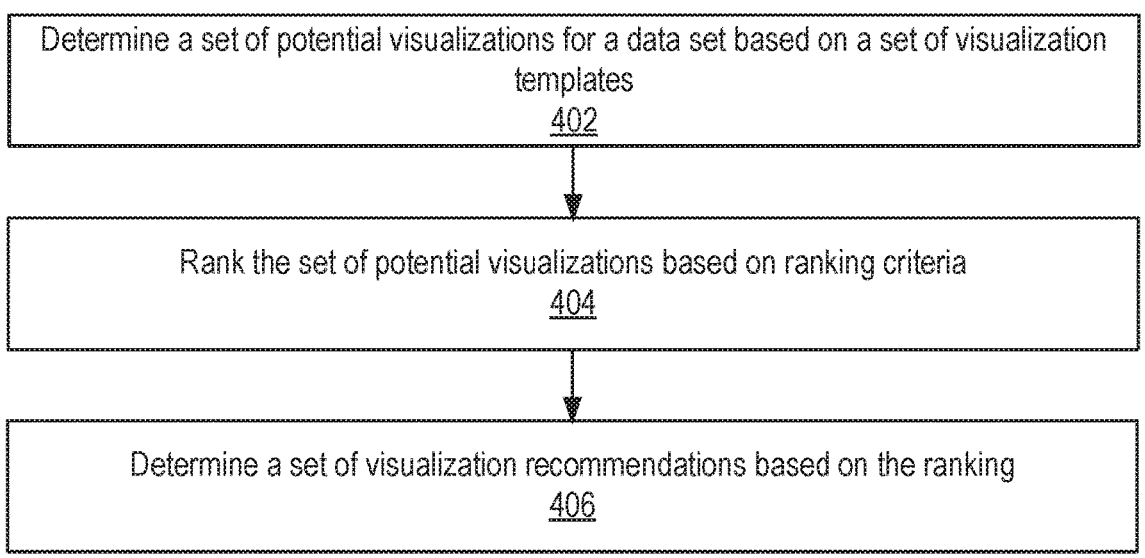
FIG. 4 illustrates an example method associated with automatically generating visualization recommendations for a data set, according to an embodiment of the present disclosure.

FIG. 4 illustrates an example method 400 associated with automatically generating visualization recommendations for a data set, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can determine a set of potential visualizations for a data set based on a set of visualization templates. At block 404, the example method 400 can rank the set of potential visualizations based on ranking criteria. At block 406, the example method 400 can determine a set of visualization recommendations based on the ranking.

Figure 5:
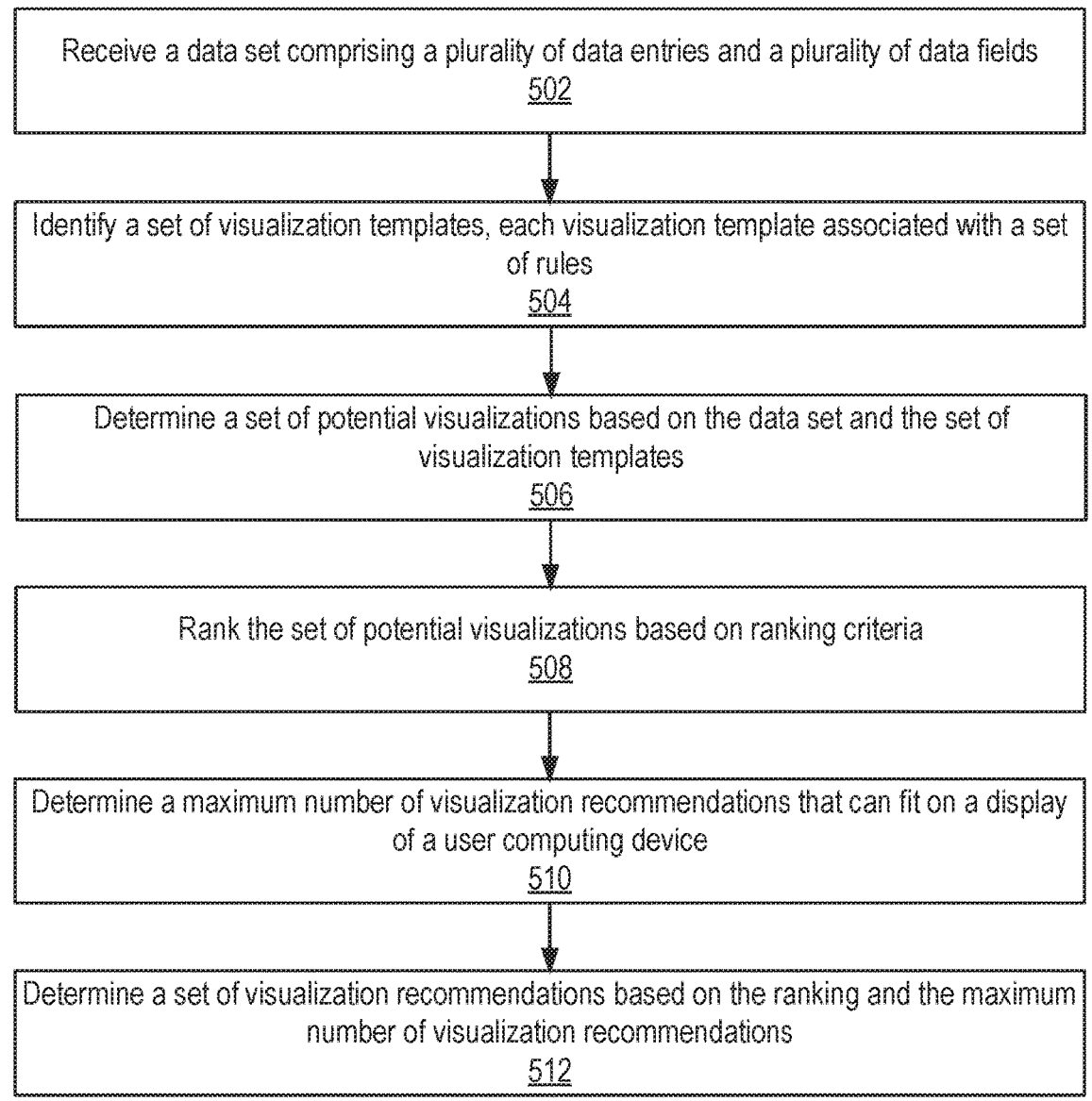
FIG. 5 illustrates an example method associated with providing automated data visualization recommendations, according to an embodiment of the present disclosure.

FIG. 5 illustrates an example method 500 associated with providing automatically generated visualization recommendations for a data set, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a data set comprising a plurality of data entries and a plurality of data fields. At block 504, the example method 500 can identify a set of visualization templates, each visualization template associated with a set of rules. At block 506, the example method 500 can determine a set of potential visualizations based on the data set and the set of visualization templates. At block 508, the example method 500 can rank the set of potential visualizations based on ranking criteria. At block 510, the example method 500 can determine a maximum number of visualization recommendations that can fit on a display of a user computing device. At block 512, the example method 500 can determine a set of visualization recommendations based on the ranking and the maximum number of visualization recommendations.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
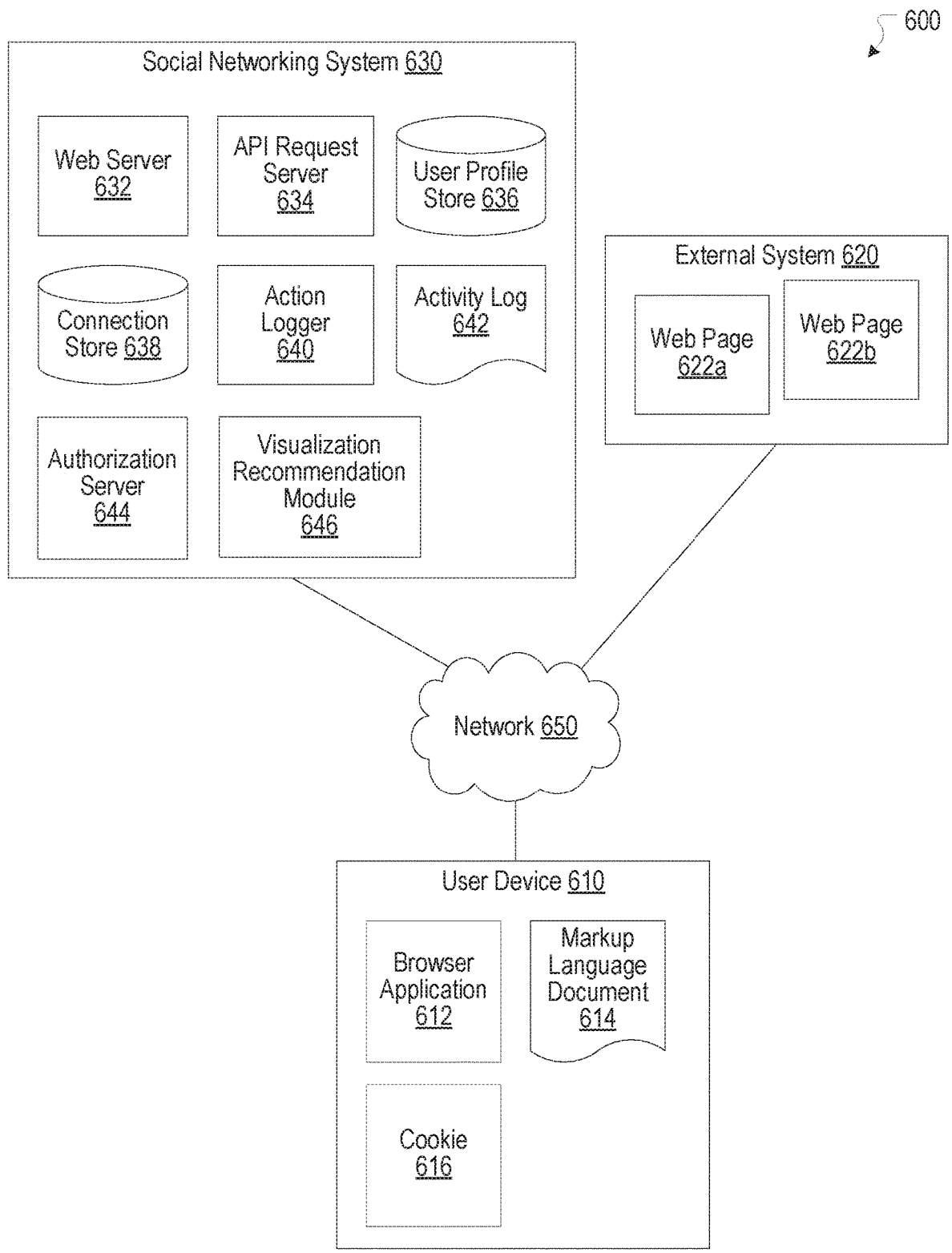
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing engagements between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and engagements with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and engagements.

The social networking system 630 also includes user-generated content, which enhances a user's engagements with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the engagement of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the engagements and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's engagement with an external system 620 from the web server 632. In this example, the external system 620 reports a user's engagement according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing engagements between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a visualization recommendation module 646. The visualization recommendation module 646 can, for example, be implemented as the visualization recommendation module 102, as discussed in more detail herein. As discussed previously, it should be appreciated that there can be many variations or other possibilities. For example, in some embodiments, one or more functionalities of the visualization recommendation module 646 can be implemented in the user device 610.

Hardware Implementation

Figure 7:
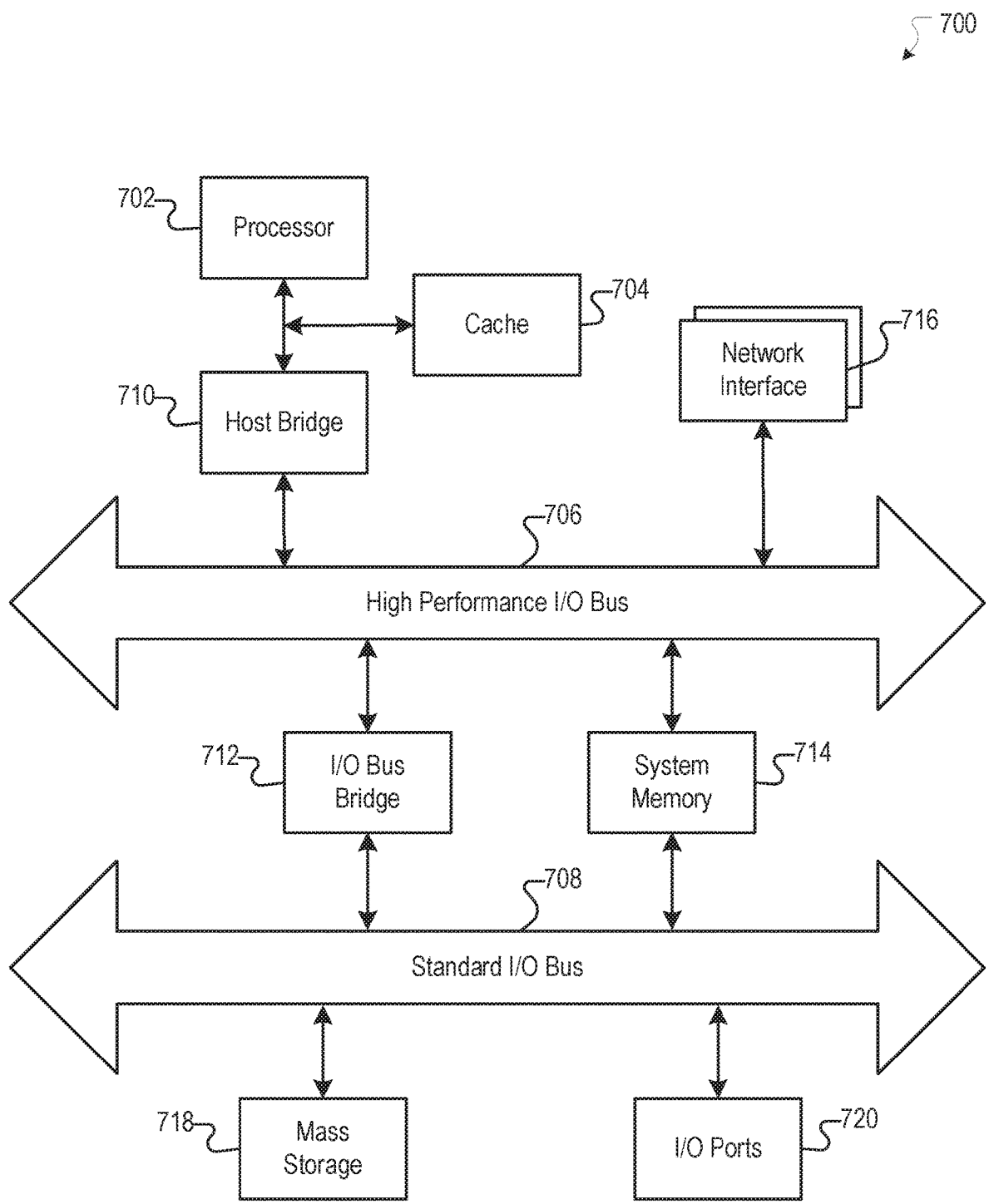
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a data set comprising at least a first dimension associated with a first data field having a first cardinality and a second dimension associated with a second data field having a second cardinality;
   determining, by the computing system, a set of potential visualizations for the data set based on a set of visualization templates, wherein the determining the set of potential visualizations comprises:
      including a first potential visualization in the set of potential visualizations based on the first cardinality of the first data field satisfying a first threshold and the second cardinality of the second data field satisfying a second threshold;
   ranking, by the computing system, the set of potential visualizations based on ranking criteria; and
   determining, by the computing system, a set of visualization recommendations for the data set based on the ranking and a maximum number of visualization recommendations.

2. The computer-implemented method of claim 1, wherein each visualization template of the set of visualization templates is associated with one or more rules.

3. The computer-implemented method of claim 2, wherein the at least one rule specifies that the first data field must have the first cardinality below the first threshold.

4. The computer-implemented method of claim 2, wherein the at least one rule specifies that the first data field must have the first cardinality above the first threshold.

5. The computer-implemented method of claim 1, wherein the ranking criteria comprise past user behavior information.

6. The computer-implemented method of claim 1, wherein the set of potential visualizations are ranked based on a machine learning model.

7. The computer-implemented method of claim 1, further comprising determining the maximum number of visualization recommendations that can fit on a display of a user computing device.

8. The computer-implemented method of claim 1, wherein the data set is received from a user or is a result of a user query.

9. The computer-implemented method of claim 1, wherein the ranking the set of potential visualizations based on ranking criteria further comprises:

determining types of visualizations for the set of potential visualizations, each potential visualization associated with a corresponding type of visualization; and upranking a second potential visualization in the set of potential visualizations based on a determination that top ranked potential visualizations do not include a type of visualization associated with the second potential visualization.

10. A system comprising:

at least one processor; and a memory storing instructions that, when executed by the at least one processor, cause the system to perform a method comprising:

receiving a data set comprising at least a first dimension associated with a first data field having a first cardinality and a second dimension associated with a second data field having a second cardinality;

determining a set of potential visualizations for the data set based on a set of visualization templates, wherein the determining the set of potential visualizations comprises:

including a first potential visualization in the set of potential visualizations based on the first cardinality of the first data field satisfying a first threshold and the second cardinality of the second data field satisfying a second threshold;

ranking the set of potential visualizations based on ranking criteria; and determining a set of visualization recommendations for the data set based on the ranking and a maximum number of visualization recommendations.

11. The system of claim 10, wherein each visualization template of the set of visualization templates is associated with one or more rules.

12. The system of claim 11, wherein the at least one rule specifies that the first data field must have the first cardinality below the threshold.

13. The system of claim 11, wherein the at least one rule specifies that the first data field must have the first cardinality above the first threshold.

14. The system of claim 10, wherein the ranking the set of potential visualizations based on ranking criteria further comprises:

determining types of visualizations for the set of potential visualizations, each potential visualization associated with a corresponding type of visualization; and upranking a second potential visualization in the set of potential visualizations based on a determination that top ranked potential visualizations do not include a type of visualization associated with the second potential visualization.

15. A non-transitory computer-readable storage medium including instructions that, when executed by at least one processor of a computing system, cause the computing system to perform a method comprising:

receiving a data set comprising at least a first data field having a first dimension associated with a first cardinality and a second data field having a second dimension associated with a second cardinality;

determining a set of potential visualizations for the data set based on a set of visualization templates, wherein the determining the set of potential visualizations comprises:

including a first potential visualization in the set of potential visualizations based on the first cardinality of the first data field satisfying a first threshold and the second cardinality of the second data field satisfying a second threshold;

ranking the set of potential visualizations based on ranking criteria; and determining a set of visualization recommendations for the data set based on the ranking and a maximum number of visualization recommendations.

16. The non-transitory computer-readable storage medium of claim 15, wherein each visualization template of the set of visualization templates is associated with one or more rules.

17. The non-transitory computer-readable storage medium of claim 16, wherein the at least one rule specifies that the first data field must have the first cardinality below the first threshold.

18. The non-transitory computer-readable storage medium of claim 16, wherein the at least one rule specifies that the first data field must have the first cardinality above the first threshold.

19. The non-transitory computer-readable storage medium of claim 15, wherein the ranking the set of potential visualizations based on ranking criteria further comprises:

determining types of visualizations for the set of potential visualizations, each potential visualization associated with a corresponding type of visualization; and upranking a second potential visualization in the set of potential visualizations based on a determination that top ranked potential visualizations do not include a type of visualization associated with the second potential visualization.

* * * * *